US010284676B2

(12) United States Patent
Demsey

(10) Patent No.: US 10,284,676 B2
(45) Date of Patent: May 7, 2019

(54) SYSTEMS AND METHODS FOR CACHING AUGMENTED REALITY TARGET DATA AT USER DEVICES

(71) Applicant: Oath (Americas) Inc., New York, NY (US)

(72) Inventor: Seth Mitchell Demsey, Dulles, VA (US)

(73) Assignee: Oath (Americas) Inc., New York, NY (US)

( * ) Notice: Subject to any disclaimer, the term of this patent is extended or adjusted under 35 U.S.C. 154(b) by 0 days.

(21) Appl. No.: 16/059,785

(22) Filed: Aug. 9, 2018

(65) Prior Publication Data
US 2018/0352048 A1 Dec. 6, 2018

Related U.S. Application Data

(63) Continuation of application No. 15/376,877, filed on Dec. 13, 2016, now Pat. No. 10,075,552, which is a (Continued)

(51) Int. Cl.
*G06K 9/00* (2006.01)
*G06N 5/04* (2006.01)
(Continued)

(52) U.S. Cl.
CPC ...... *H04L 67/2842* (2013.01); *G06F 17/3089* (2013.01); *G06F 17/30902* (2013.01);
(Continued)

(58) Field of Classification Search
CPC . H04L 67/2842; H04L 67/38; G06F 17/3089; G06F 17/30902; G06K 9/00671; G06N 5/048
See application file for complete search history.

(56) References Cited

U.S. PATENT DOCUMENTS

| 5,926,568 | A | 7/1999 | Chaney et al. |
| 8,712,193 | B2 * | 4/2014 | Boncyk ............ G06F 17/30259 382/103 |
| 2005/0027600 | A1 | 2/2005 | Phillips |
| 2006/0233423 | A1 | 10/2006 | Najafi et al. |
| 2007/0035562 | A1 | 2/2007 | Azuma et al. |

(Continued)

FOREIGN PATENT DOCUMENTS

EP 2428915 A2 3/2012

OTHER PUBLICATIONS

International Search Report and Written Opinion for corresponding International Application No. PCT/US2014/047746, dated Oct. 27, 2014, 11 pages.
(Continued)

*Primary Examiner* — Wing F Chan
*Assistant Examiner* — Billy H Ng
(74) *Attorney, Agent, or Firm* — Bookoff McAndrews, PLLC

(57) ABSTRACT

Systems and methods are disclosed for transmitting, to user devices, data for potential targets predicted to be identified in an augmented reality application. One method includes receiving a request for target data related to at least one physical object within an image of a real-world environment captured at the device; identifying a current target representing the physical object within a virtual environment corresponding to the real-world environment; determining at least one potential future target to be identified at the device based on identified coincident target requests; and sending to the device target data for each of the current and potential future targets based on the determination, wherein the device presents the target data for the current target within the virtual environment displayed at the device and store the target data for the potential future target in a local memory of the device.

19 Claims, 7 Drawing Sheets

Related U.S. Application Data continuation of application No. 15/158,655, filed on May 19, 2016, now Pat. No. 9,553,946, which is a continuation of application No. 13/953,459, filed on Jul. 29, 2013, now Pat. No. 9,374,438.

(51) Int. Cl.
*G06F 17/30* (2006.01)
*H04L 29/06* (2006.01)
*H04L 29/08* (2006.01)

(52) U.S. Cl.
CPC ......... *G06K 9/00671* (2013.01); *G06N 5/048* (2013.01); *H04L 67/38* (2013.01)

(56) References Cited

U.S. PATENT DOCUMENTS

| | | |
|---|---|---|
| 2012/0047445 A1 | 2/2012 | Rajagopal |
| 2012/0062595 A1* | 3/2012 | Oh .................. G06K 9/00671 345/633 |
| 2012/0151539 A1 | 6/2012 | Funge et al. |
| 2012/0264511 A1 | 10/2012 | Marsland et al. |
| 2014/0146082 A1* | 5/2014 | So .................. G06K 9/00671 345/633 |
| 2014/0244595 A1 | 8/2014 | Cardonha et al. |

OTHER PUBLICATIONS

International Preliminary Report on Patentability for corresponding International Application No. PCT/US2014/047746, dated Feb. 2, 2016, 8 pages.

* cited by examiner

| TARGETS | ID | TARGET DATA | | |
|---|---|---|---|---|
| A | $A_{ID}$ | $A_{TEXT}$ | $A_{GRAPHIC}$ | $A_{LINK}$ |
| B | $B_{ID}$ | $B_{TEXT}$ | $B_{GRAPHIC}$ | $B_{LINK}$ |
| C | $C_{ID}$ | $C_{TEXT}$ | $C_{GRAPHIC}$ | $C_{LINK}$ |
| D | $D_{ID}$ | $D_{TEXT}$ | $D_{GRAPHIC}$ | $D_{LINK}$ |
| E | $E_{ID}$ | $E_{TEXT}$ | $E_{GRAPHIC}$ | $E_{LINK}$ |
| F | $F_{ID}$ | $F_{TEXT}$ | $F_{GRAPHIC}$ | $F_{LINK}$ |

*FIG. 6A*

| TARGET REQUEST LOG | | | |
|---|---|---|---|
| ORDER | USER 1 | USER 2 | USER 3 |
| 1 | B | B | B |
| 2 | C | C | D |
| 3 | E | F | E |
| 4 | D | A | F |
| 5 | A | D | A |
| 6 | B | E | B |

*FIG. 6B*

SYSTEMS AND METHODS FOR CACHING AUGMENTED REALITY TARGET DATA AT USER DEVICES

CROSS-REFERENCE TO RELATED APPLICATIONS

This application is a continuation of and claims the benefit of priority to U.S. Nonprovisional patent application Ser. No. 15/376,877 filed on Dec. 13, 2016, which is a continuation of U.S. Nonprovisional patent application Ser. No. 15/158,655 filed on May 19, 2016; now U.S. Pat. No. 9,553,946, issued Jan. 24, 2017, which is a continuation of U.S. Nonprovisional patent application Ser. No. 13/953,459, filed on Jul. 29, 2013; now U.S. Pat. No. 9,374,438, issued Jun. 21, 2016, which are incorporated herein by reference in their entirety.

TECHNICAL FIELD

Embodiments of the present disclosure relate generally to displaying data on mobile devices in relation to physical locations and objects and, more particularly, to transmitting and caching data on mobile devices in relation to physical locations and objects likely to be identified and requested for display in mobile augmented reality applications.

BACKGROUND

Augmented reality (AR) applications present users with an augmented or enhanced view of a real-world environment, in which relevant content can be overlaid onto physical objects or points of interest located within the environment. For example, a mobile AR application executable at a user's mobile device may overlay static or dynamic AR content related to various physical objects in the real-world environment. Each physical object may be identified by the mobile AR application as a predefined "target" that can be represented digitally within a virtual AR environment displayed for the user via a display of the mobile device. The virtual AR environment and objects represented may be based on, for example, images of the real-world environment captured by a digital camera integrated with the mobile device. Examples of different types of AR content that may be overlaid for an object in the real-world (e.g., identified as a target in the virtual AR world) may include, but are not limited to, text, images, graphics, or location information, e.g., geographic location coordinates from a global positioning system (GPS).

However, conventional techniques for identifying targets within AR environments provided by mobile AR applications generally require a compromise between speed (e.g., with respect to AR target identification and content delivery) and efficiency (e.g., with respect to memory usage for storing target data). For example, speed may be increased by storing static target data for every identifiable target within a local memory of the mobile device. However, this would place a significant burden on memory and other system resources, particularly if the number of identifiable targets is extremely large (e.g., over a million or billion targets).

Alternatively, efficiency may be improved by offloading target identification operations to a server and/or storing the target data in a remote storage location (e.g., a cloud-based data store), which may be dynamically accessed by the mobile AR application via a communication network. However, the speed of target identification at the mobile device may be significantly reduced due to, for example, data propagation delays or bandwidth issues in the network.

Thus, such conventional solutions for target identification based on either static local data or dynamic data located remotely pose significant challenges to providing support for AR environments representing relatively more complex real-world environments with large numbers of identifiable targets (e.g., millions of targets related to individual consumer product items within a commercial business), it becomes even more critical for the mobile AR application to quickly identify a large number targets, while also maintaining an acceptable or desired level of responsiveness and overall system performance.

SUMMARY OF THE DISCLOSURE

According to certain embodiments, methods are disclosed for predicting potential targets to be identified in a mobile augmented reality application based on coincident targets identified previously, and for predicting potential future targets for a user of a mobile augmented reality application based on high-correlating targets identified during a session of user activity.

According to certain embodiments, a method is disclosed for transmitting, to user devices, data for potential targets predicted to be identified in an augmented reality application. One method includes receiving, over a network, a request from a user's device for target data related to at least one physical object within an image of a real-world environment captured at the device; responsive to the received request, identifying a current target representing the physical object within a virtual environment corresponding to the real-world environment; identifying coincident target requests based on the identified current target and a log of prior requests for targets identified previously; determining at least one potential future target to be identified at the device based on the identified coincident target requests; and sending to the device, over the network, target data for each of the current target and the potential future target based on the determination, wherein the device is configured to present the target data for the current target within the virtual environment displayed at the device and store the target data for the potential future target in a local memory of the device.

According to certain embodiments, the target data for the current target includes predefined content to be displayed as an overlay corresponding to a location of the current target, as represented within the virtual environment.

According to certain embodiments, the determining step comprises: calculating correlation scores for respective targets related to the coincident target requests, the correlation scores representing a degree of correlation between each of the targets and the current target; assigning the calculated correlation scores to the respective targets related to the coincident target requests; ranking the targets related to the coincident target requests based on the assigned correlation scores; and determining the at least one potential future target based on the ranking.

According to certain embodiments, the at least one potential future target corresponds to a predetermined number of high-ranking targets determined to have a relatively high degree of correlation to the coincident target requests.

According to certain embodiments, the identifying step comprises: identifying the coincident target requests based on the log of prior requests and one or more correlation parameters associated with prior requests in the log.

According to certain embodiments, the one or more correlation parameters include a time that each prior request for a previously identified target was sent by a device, a geographic location of a physical object corresponding to the previously identified target, and a user identifier associated with a user of the device from which the prior request was sent.

According to certain embodiments, the one or more correlation parameters further include a predetermined target category associated with the previously identified target; the request is received during a current session of user activity and the log of prior requests corresponds to targets identified during one or more previous sessions of user activity; the current session corresponds to a predetermined time period of the user's interaction with a client application executable at the device; and/or the potential future target is to be identified prior to an expiration of the current session.

According to certain embodiments, a system is disclosed for transmitting, to user devices, data for potential targets predicted to be identified in an augmented reality application. One system includes a data storage device storing instructions for transmitting data for potential targets predicted to be identified in an augmented reality application; and a processor configured to execute the instructions to execute: a request manager to receive, over a network, a request from a user's device for target data related to at least one physical object within an image of a real-world environment captured at the device; a target identifier to identify a current target representing the physical object within a virtual environment corresponding to the real-world environment, based on the request received by the request manager; a target classifier to identify coincident target requests related to the received request for the current target based on a log of prior requests for targets identified during a session of user activity, and determine at least one potential future target to be identified at the device based on the identified targets related to the current target; and a data manager configured to send, to the device over the network, target data corresponding to each of the current target and the potential future target, based on the determination by the target classifier, wherein the device is configured to provide a visual representation of the current target within the virtual environment based on the corresponding target data, and store the target data for the potential future target in a local memory of the device.

According to certain embodiments, the target classifier is configured to: calculate a correlation score for each target related to the coincident target requests, the correlation score representing a degree of correlation between each of the targets and the current target; assign the calculated correlation scores to the respective targets related to the coincident target requests; rank the targets related to the coincident target requests based on the assigned correlation scores; and determine at least one potential future target based on the ranked targets related to the coincident target requests.

According to certain embodiments, the at least one potential future target corresponds to a predetermined number of high-ranking targets determined to have a relatively high degree of correlation to the coincident target requests; the target identifier is configured to identify the coincident target requests based on prior requests in the log of prior requests and one or more correlation parameters associated with prior requests in the log; the one or more correlation parameters include a time that a prior request for a previously identified target was sent by a device, a geographic location of a physical object corresponding to the previously identified target, and a user identifier associated with a user of the device from which the prior request was sent; the one or more correlation parameters further include a predetermined target category associated with the previously identified target; the request for target data is received by the request manager from the user's device during a current session of user activity and the coincident target requests related to the current target are based on prior requests received during one or more previous sessions of user activity; the potential future target is to be identified prior to an expiration of the current session; the current session corresponds to a predetermined time period of the user's interaction with a client application executable at the device.

According to certain embodiments, a computer readable storage medium is disclosed including instructions that, when executed by a computer, cause the computer to perform a plurality of functions, including functions to: receiving a request from a user's device for target data related to at least one physical object within an image of a real-world environment captured at the device; responsive to the received request, identifying a current target representing the physical object within a virtual environment corresponding to the real-world environment; identifying coincident target requests based on the identified current target and a log of prior requests for targets identified previously; determining at least one potential future target to be identified at the device based on the identified coincident target requests; and sending target data for each of the current target and the potential future target via a network to the device based on the determination, wherein the device is configured to present the target data for the current target within the virtual environment displayed at the device and store the target data for the potential future target in a local memory of the device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6A illustrates an exemplary array of targets and target data associated with augmented reality targets for a mobile AR application.

FIG. 6B illustrates an exemplary request log of user requests related to the augmented reality targets of FIG. 6A.

DESCRIPTION OF THE EMBODIMENTS

Reference will now be made in detail to the exemplary embodiments of the disclosure, examples of which are illustrated in the accompanying drawings.

Wherever possible, the same reference numbers will be used throughout the drawings to refer to the same or like parts.

The present disclosure relates to streaming or otherwise transmitting target data for targets (or "future targets") predicted to be potentially identified by a mobile AR application executable at a user's mobile device, based on coincident requests for related targets previously identified during a session of user activity. The word "target(s)" is used herein to describe a virtual representation or identification of a real-world, i.e., physical, object. In one embodiment, an AR application server may stream or otherwise transmit the target data to a local AR cache within a memory of the mobile device. The local AR cache may be one or more predefined or dynamically allocated memory blocks of any size, which may be reserved for storing target data. The mobile AR application in this example may be configured to identify targets corresponding to physical objects to be represented within an AR environment accessed based on the target data stored within the local AR cache at the mobile device.

For example, in some cases, a user may be in a particular real world environment, and may be encountering one or more real world objects, such as a product, a printed article of content, an electronic display of content, a location, etc. The user may scan or otherwise request AR data associated with the particular object in the real world environment. According to certain aspects of the present disclosure, the user's electronic device may cause an AR server to begin predicting, based on the identity and other aspects of the scanned objects, what other future objects the user might scan. Accordingly, the AR server may preemptively stream or otherwise send to the user's device the AR data associated with the one or more future targets that the AR server predicts the user will likely soon encounter and scan to request associated AR data.

As will be described in further detail below, the virtual AR environment and objects represented may correspond to a current view of the real world based on images captured by a digital camera integrated with the mobile device and displayed for the user via a display of the mobile device. A physical object in the real world may correspond to a predefined reference marker or "target" in the virtual AR world provided for the user by the mobile AR application at the mobile device. AR content associated with a physical object (or predefined AR target) may include, for example and without limitation, text, images, graphics, or location information, e.g., geographic location coordinates from a global positioning system (GPS), and/or textual, image, video, or audio advertisements(s) or sponsored content.

Figure 1:
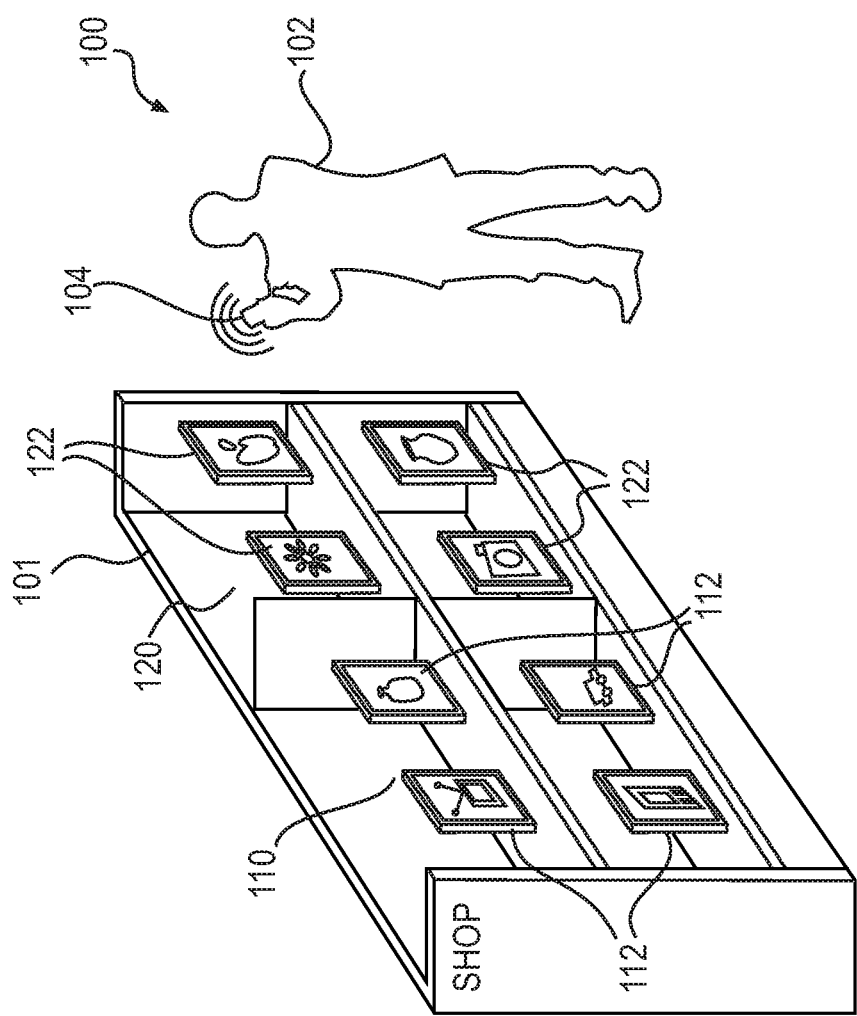
FIG. 1 illustrates an exemplary real-world environment in which target data for potential targets to be identified by a mobile AR application executable at a user's mobile device may be transmitted to the mobile device.

FIG. 1 illustrates an exemplary real-world environment 100, in which target data may be transmitted to a mobile device 104 of a user 102, for potential future targets likely to be identified by a mobile AR application of the device, based on coincident requests for targets identified during a session of user activity. In the example shown in FIG. 1, user environment 100 may be a storefront of a commercial business 101, which displays various products or objects. For example, user environment 100 may be a shopping mall, grocery, restaurant, department store, boutique store, transit location (e.g., airport, train station, bus stop, rest area, etc.), or the like. The user environment 100 may alternatively be an amusement park, concert venue, museum, park, or any other tourist attraction having physical objects or locations of interest to one or more users. In one embodiment, the user environment 100 may include a printed or electronic display of content, such as an electronic screen or touchscreen displaying electronic content to the user, or a newspaper, magazine, or sign displaying printed content to the user, in which cases an object having associated AR target data may be any printed or electronic content (e.g., an article, image, ad, etc.).

As shown in FIG. 1, in one embodiment, the user environment 100 may include a first zone 110 having a plurality of objects 112, and a second zone 120 having a plurality of objects 122, and each of the objects 112, 122 may be identifiable by a mobile device 104. According to certain aspects of the present disclosure, a user 102 may operate a mobile application executed on mobile device 104 to request and obtain virtual or AR data associated with one or more of objects 112, 122. As described above, the present disclosure is directed to improving both the speed and efficiency at which the user's device 104 may request and obtain such virtual or AR data. For example, if a user 102 requests AR data for an object 122, an associated AR server may determine that the user 102 is more likely to subsequently request AR data for another one of objects 122 within zone 120, and therefore preemptively stream data associated with each of objects 122 to the user's device 104. Likewise, if a user 102 requests AR data for an object 112, an associated AR server may determine that the user 102 is more likely to subsequently request AR data for another one of objects 112 within zone 110, and therefore preemptively stream data associated with each of objects 112 to the user's device 104.

Although FIG. 1 depicts zones 110 and 120 as physical zones defined by space, it should be appreciated that zones 110, 120 may alternatively be subject matter categories, product types, stores, brands, etc. Of course, instead of preemptively streaming data associated with an entire zone 110, 120, the associated AR server might preemptively stream data associated with only a subset of the similar objects to the user (e.g., for those objects for which a user is statistically more likely to request AR data in the near future). Moreover, the associated AR server may preemptively stream any desired amount of data associated with any desired number of predicted future objects (i.e., AR targets). For example, the associated AR server may preemptively stream to a user's device the AR data associated with the "N" next objects the user is most likely to scan or otherwise request, regardless of which "zone" such objects may exist within.

Figure 2:
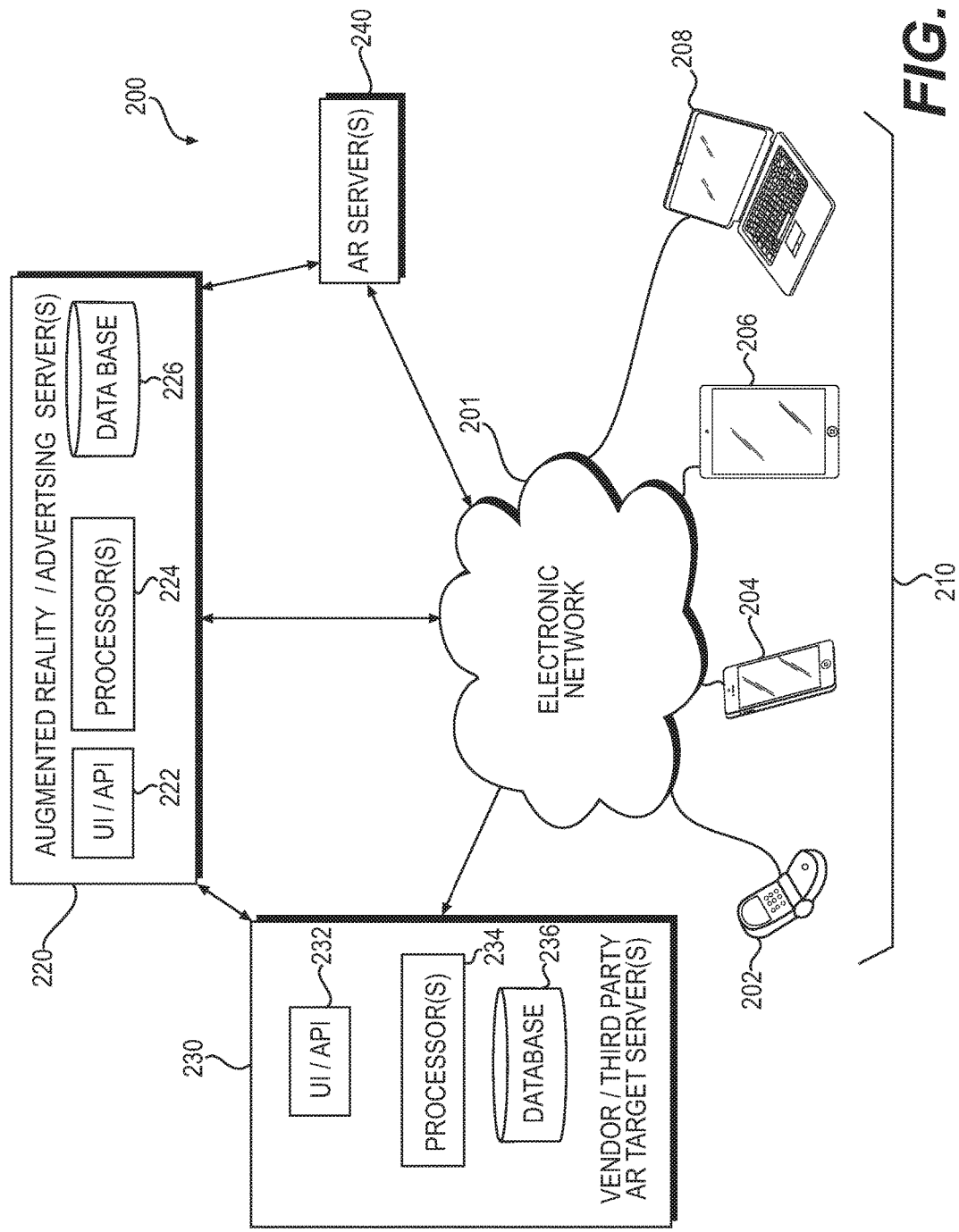
FIG. 2 is a diagram of an exemplary network environment and systems suitable for practicing an embodiment of the present disclosure.

FIG. 2 is a schematic diagram of an environment in which devices and servers may interact to perform methods of transmitting and caching data on mobile devices in relation to physical locations and objects likely to be identified and targeted for display in mobile augmented reality applications, according to an exemplary embodiment of the present disclosure. Specifically, FIG. 2 illustrates an exemplary environment 200 including one or more user devices 210, and/or one or more server systems 220, 230, 240. The present disclosure is applicable to data transfer between any combination of user devices 210, and server systems 220, 230, 240.

As depicted in FIG. 2, user devices 210 may include, for example, a mobile phone 202, a mobile device 204, a tablet 206, and/or a laptop, computer or server 208. In one embodiment, user devices 210 may be owned and used by one or more people, who may be viewers of web pages and/or consumers of content over the Internet, either through an application, mobile browser, or web browser stored on respective user devices. User devices 210 may include any type of electronic device configured to send and receive data, such as websites, multimedia content, and electronic advertisements, over electronic network 201. For example, each of user devices 210 may include a mobile device, smartphone, personal digital assistant ("PDA"), a navigation device, a portable game console, personal computer, laptop, server, or any combination of these computing devices or other types of mobile computing devices having at least one processor, a local memory, a display, one or more user input devices, and a network communication interface disposed in communication with electronic network 201.

Each of user devices 210 may have a web browser and/or mobile browser installed for receiving and displaying electronic content received from one or more web servers. Each of user devices 210 may have an operating system configured to execute a web or mobile browser, and any type of application, such as a mobile application. In one embodiment, user devices 210 may be configured to download applications and/or application content from application servers. In one embodiment, user devices 210 may be configured to download one or more augmented reality mobile applications from a mobile application server, and execute those one or more augmented reality applications to receive and manipulate electronic augmented reality content received from one or more of web servers and/or content distribution servers.

As shown in FIG. 2, the environment 200 may include one or more augmented reality and/or advertising servers 220, one or more vendor and/or third party augmented reality servers 230, and one or more auxiliary augmented reality servers 240. The one or more server systems 220, 230, 240 may include any type of web server, service, or any other type of web resource that may be accessed by one or more of user devices 210, and/or each other. Specifically, the one or more server systems 220, 230, 240 may represent any of various types of servers including, but not limited to a web server, an application server, a proxy server, a network server, or a server farm. The one or more server systems 220, 230, 240 may be implemented using any general-purpose computer capable of serving data to user devices 210 or any other computing devices (not shown) via network 201. Such other computing devices may include, but are not limited to, any device having a processor and memory for executing and storing instructions. Software may include one or more applications and an operating system. Hardware may include, but is not limited to, a processor, e.g., processors 224, 234, a memory device, e.g., databases 226, 236, and modules 222, 232 of graphical user interface(s) ("GUIs"), and/or application programming interface(s) ("APIs"). The computing device may also have multiple processors and multiple shared or separate memory components. For example, the computing device may be a clustered computing environment or server farm.

While only servers 220, 230, 240 are shown, additional servers may be used as desired. Similarly, while only user devices 210 are shown, network environment 200 may include, for any number of users, additional user devices that also may be configured to communicate with servers 220, 230, 240 via network 201. Network 201 can be any network or combination of networks that can carry data communication. Network 201 may include, but is not limited to, a local area network, medium area network, and/or wide area network, such as the Internet. Any or all of the devices 210 and/or servers 220, 230, 240 may be disposed in communication with an electronic network 201, such as the Internet. Moreover, any pair of the devices 210 and/or servers 220, 230, 240 may be configured to exchange data packets over the electronic network 201 according to any suitable predetermined protocol, such as hypertext transfer protocol ("HTTP"). Any or all of the devices 210 and/or servers 220, 230, 240 may be configured to perform various techniques for exchanging requests for data, responses to requests for data, and data, in manners so as to transmit and cache data on mobile devices in relation to physical locations and objects likely to be identified and targeted for display in mobile augmented reality applications.

As shown in FIG. 2, server systems 220, 230 may each include or be provided in communication with one or more databases 226, 236. Databases 226, 236 may be any type of database or data repository for storing data accessible by server systems 220, 230. Although only databases 226, 236 are shown, additional databases may be used as desired. As will be described in further detail below, databases 226, 236 may be used to store, for example, data related to various targets representing physical real-world objects in a mobile AR application (e.g., a client application) executable at each of user devices 210. Also, as will be described in further detail below, server systems 220, 230 in this example may be an application server configured to serve target data for potential targets to be identified for a user of client application at each of user devices 210. In a further example, a client application may provide an interface at each of user devices 210 for acquiring data or executable software instructions from an associated AR application or service hosted at servers 220, 230 via network 201.

Figure 3:
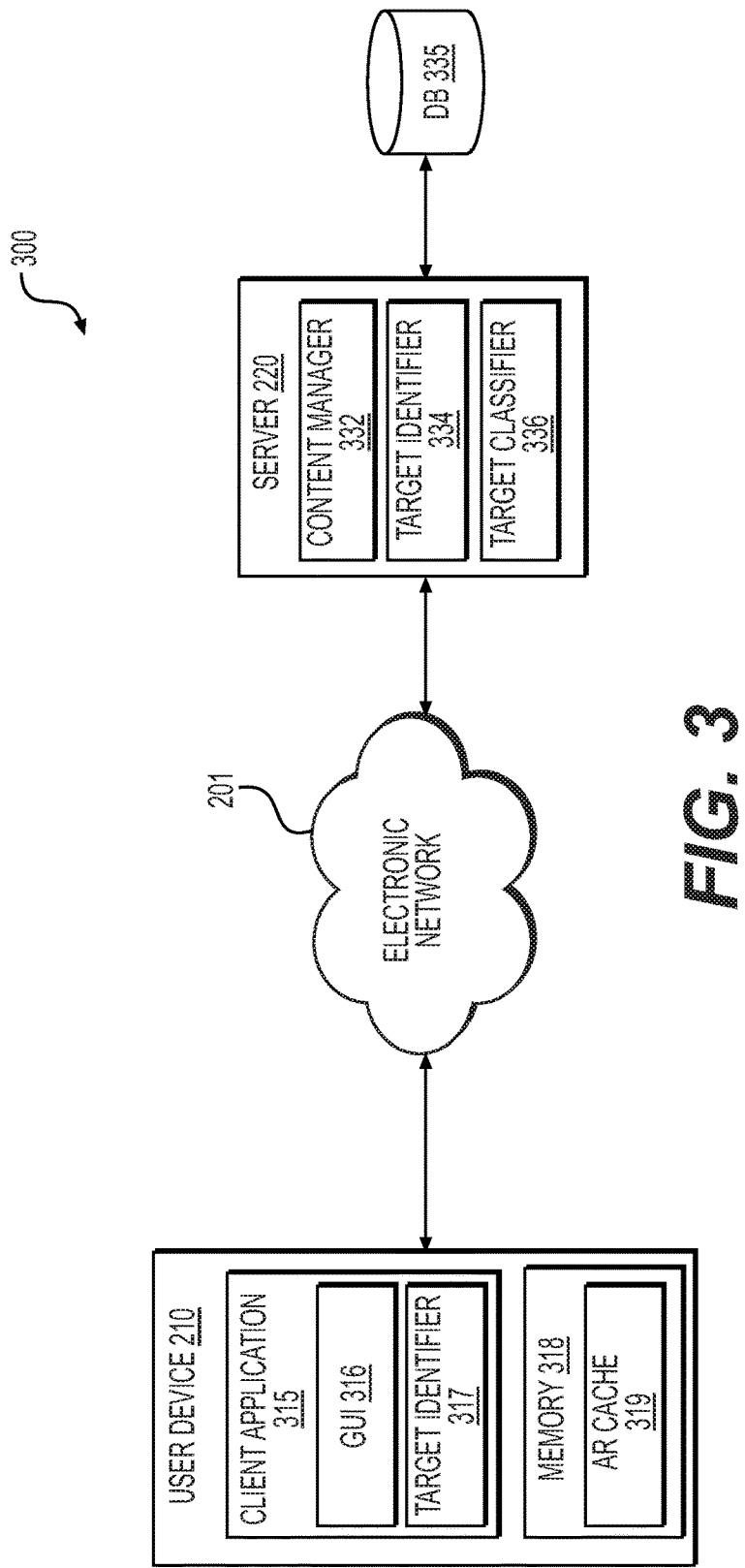
FIG. 3 is a block diagram of an exemplary client-server system for transmitted target data related to potential future targets that may be identified for a user of a mobile AR application during a session of user activity.

FIG. 3 is a block diagram of an exemplary client-server arrangement 300 that may be implemented by user devices 210 and server system(s) 220 of FIG. 2, for streaming or otherwise transmitting target data for potential targets predicted to be identified in a mobile AR application. Specifically, client-server arrangement 300 may be a client-server implementation of the network environment 200 that spans one or more networks, such as a network 201 of FIG. 2. As shown in FIG. 3, client-server arrangement 300 may include a user device 210 that is communicatively coupled to a server 220 via electronic network 201. Server 220 in turn may be coupled to a database 335, which may be database 226. User device 210 may be implemented using, for example, any of user devices 210 of FIG. 2, as described above. Similarly, server 220 and database 335 may be implemented using, for example, any of the server systems 220, 230, 240 of FIG. 2, also as described above.

As shown in the embodiment of FIG. 3, user device 210 may include a client application 315 and a memory 318. Client application 315 in this example may be mobile AR application executable at user device 310. Client application 315 may be implemented as, for example, a standalone application, or it can be executed within a web browser at user device 210 as, for example, a browser plug-in or script that executes within the browser. As shown in FIG. 3, client application 315 may be configured to communicate via network 201 with an associated AR application or service hosted at server 220 in order to provide AR functionality to a user of client application 315 at user device 210.

In the example shown in FIG. 3, client application 315 may include a graphical user interface (GUI) 316 and a target identifier 317. GUI 316 may be adapted to provide a virtual representation of a real-world environment including AR content related to one or more physical objects or points of interest located within the real-world environment via a display (e.g., a touch-screen display) of user device 210. As described above, such a virtual AR environment may be based on, for example, an image or video captured by a digital camera (not shown) that may be coupled to or integrated with user device 210. The captured image(s) may be of a single object or a real-world scene including multiple objects. In addition, the captured image may be, for example and without limitation, a barcode, such as a Universal Product Code (UPC), QR-Code, or other type of machine-readable or coded symbol that uniquely identifies a physical object and is generally imprinted on the object itself or a label attached to the object. In some implementations, user device 210 may include a barcode scanner for scanning such a coded symbol.

Target identifier 317 in this example may be adapted to identify targets corresponding to the physical object(s) or point(s) of interest within a captured image of the real-world environment. The targets identified by target identifier 317 may be based on, for example, target data stored in an AR cache 319 of local memory 318. As described above, the target data stored in AR cache 319 may have been obtained from server 220 via network 201. In an example, target identifier 317 may detect an object within the real-world environment and attempt to find matching target data stored within AR cache 319.

In some implementations, target data stored within AR cache 319 may include, for example, information associated with a corresponding physical object within the real-world environment. Such information may include, for example, a definition of characteristic features or physical parameters associated with the object in the real-world, which may be used by target identifier 317 to recognize the object detected in the real-world environment as a target within an AR environment. This information may also be used to generate a visual representation of the physical object (or target) within the virtual AR environment. As described above, the AR environment and objects represented within the AR environment may be displayed by, for example, GUI 316 via a display of user device 210. According to certain aspects of the present disclosure, if target identifier 317 in the above example does not find target data within AR cache 319 that matches the detected object, target identifier 317 may send a request for the matching target data to server 220 via network 210.

As shown in FIG. 3, in one embodiment, the server 220 may include, among other modules and devices, a content manager 332, a target identifier 334, and/or a target classifier 336. Of course, server 220 may include other modules and devices, and server 220 may share the functions of content manager 332, target identifier 334, and/or target classifier 336 across other servers, such as server systems 230, 240 of FIG. 2. The content manager 332, target identifier 334, and/or target classifier 336 may be software modules executed by processor 224 of servers 220, or may alternatively be separate or integrated processing devices themselves. The content manager 332 may be configured to receive and aggregate AR content (e.g., ads, text, images, etc.) from any of the database(s) 335, database(s) 226, the vendor/third party AR target server(s) 230, and auxiliary server(s) 240. In one embodiment, server(s) 220 may also include a request manager configured to receive, over network 210, one or more requests from a user's mobile device 210 for target data related to one or more physical objects within an image of a real-world environment captured at the mobile device.

In one embodiment, the target identifier 334 may be configured to identify a current target representing the physical object within a virtual environment corresponding to the real-world environment, based on the one or more requests received at the server(s) 220, e.g., by the request manager. The target classifier 336 may be configured to identify coincident target requests related to a request received in relation to each current target, such as based on a log of prior requests for targets identified during a session of user activity, and determine at least one potential future target to be identified at the mobile device based on the identified targets related to the current target. Server(s) 220 may also include a data manager configured to send, to user device 210 over network 201, target data corresponding to each of the current target and the potential future target, based on the determination by the target classifier. The user device 210 may be configured to provide a visual representation of the current target within the virtual environment based on the corresponding target data, and store the target data for the potential future target in a local memory of the device.

Figure 4:
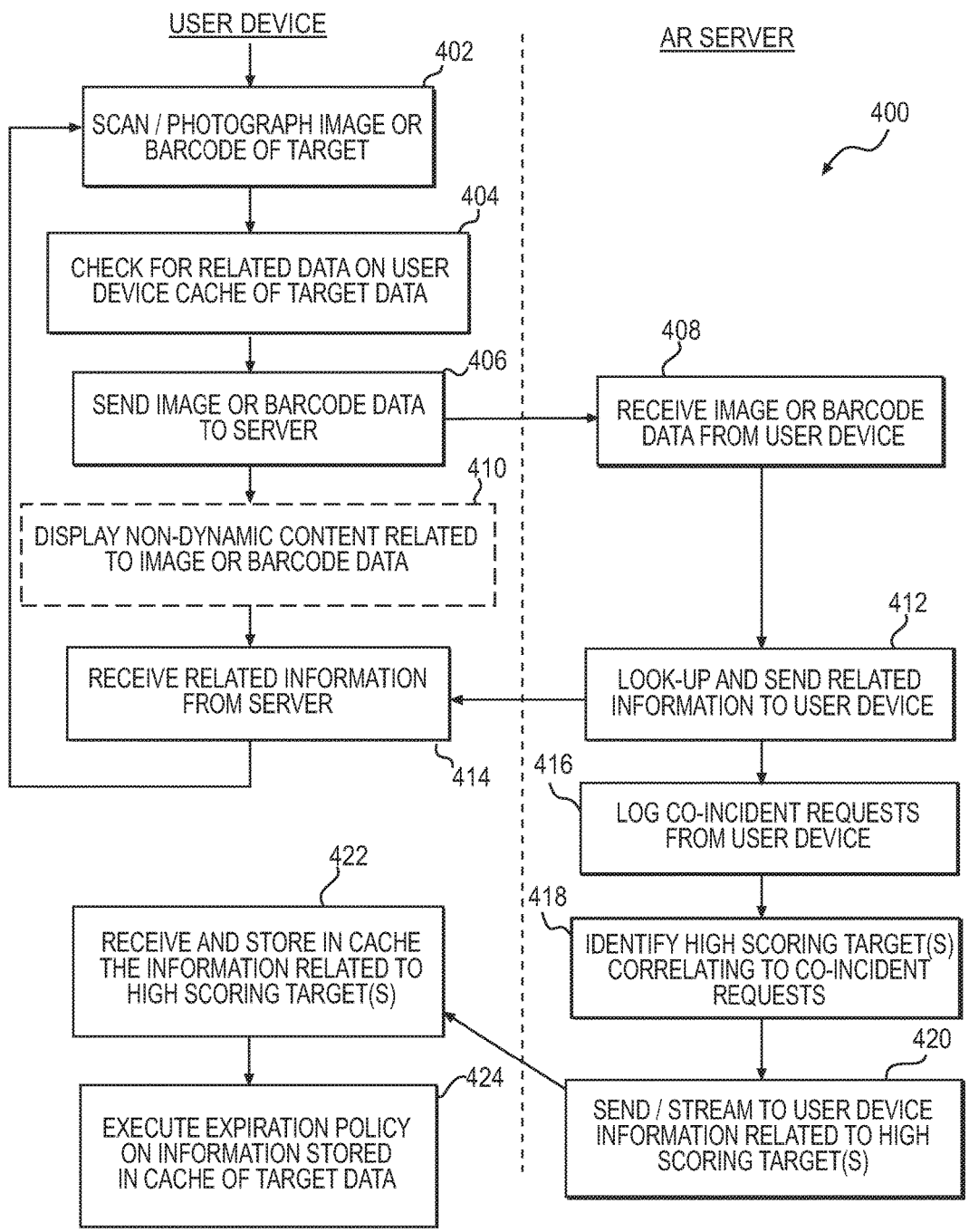
FIG. 4 is a flowchart of an exemplary method for transmitted target data related to potential future targets that may be identified for a user of a mobile AR application during a session of user activity.

FIG. 4 is a flowchart of an exemplary method 400 for streaming or otherwise transmitting target data for potential targets predicted to be identified by a mobile AR application. As shown in FIG. 4, method 400 may be performed between any user device and a server, e.g., an augmented reality (AR) server. Specifically, the method 400 of FIG. 4 may be performed by a user device 210 and a server system 220, described with respect to FIGS. 2 and 3. Alternatively or additionally, any of the AR server steps of method 400 may be performed by one or more of server systems 230, 240, of FIG. 2.

As shown in the embodiment of FIG. 4, method 400 may include a user device scanning or photographing an image or barcode of a target (step 402). For example, a user 102 may use a mobile device 104, 210 to request target data for a physical object or location. For example, a user 102 may approach one or more physical objects 112, 122 and desire to view additional virtual data (e.g., photo(s), textual description(s), pricing information, related URL(s), audio recording(s), discount codes/coupons, nutritional info, recipes, etc.) regarding those objects. In one embodiment, the user 102 may request data relating to the object by obtaining a photograph of the object using device 104, 210. Alternatively, the user 102 may execute an application of the device 104, 210 to perform image and/or textual recognition of the object, and/or to read or decode a one or two dimensional barcode or other identifying indicia on the object.

Method 400 may then include checking for data related to the identified target on the user's device, e.g., in cache or other local memory (step 404). For example, upon the user's device recognizing the object and/or identifying a target ID associated with the object or location in proximity of the user's device, the device may look-up the target ID in the cache or local memory to obtain any stored AR target data associated with the target ID. At any time before, after, or during transmission of any image, barcode, or other identifying information from the user device to the AR server, the user's device may display any non-dynamic target content that is retrieved in relation to the image or barcode data (step 410). That is, if at step 404, the user device finds related AR target data while performing a local check for that data, the device may display that AR target data to the user. For example, the user device may display an electronic reproduction of the physical object, e.g., as through a viewfinder of the user's device, and overlaid on that electronic reproduction, also display one or more virtual data items (e.g., photo(s), textual description(s), pricing information, related URL(s), advertisements, etc.).

As described above, at any time before, during, or after checking for and/or displaying locally-stored related AR data, method 400 may include sending an image, barcode data, or other identifying information about the object, or the target of the object, to the AR server (step 406). Thus, the AR server, e.g., server systems 220, may receive the image, barcode, or other identifying information from the user device (step 408). Regardless of whether the user's device found locally-stored, non-dynamic target AR data to display to the user, upon receiving the image, barcode, or other identifying information from the user device, the AR server may look-up and send AR data related to the identified target back to the user device (step 412). For example, as shown in FIG. 6A, the augmented reality and/or advertising server systems 220 may maintain a database 226 of AR targets, AR target IDs, and related target data for any number of physical objects. Of course, it should be appreciated that, although FIG. 6A only depicts six exemplary targets with associated target IDs and related data, in operation, the databases 226 may store data associated with millions, tens of millions, or billions of different objects, such as different products, digital items, people, consumer devices, tourist attractions, content items, etc. Thus, as shown in FIG. 2, augmented reality and/or advertising server systems 220 may be provided in communication with one or both of the vendor/third party AR target server(s) 230 and the auxiliary AR server(s) 240. Thus, while looking up AR target IDs and related target data for any given AR target or object, the augmented reality and/or advertising server systems 220 may additionally issue requests to the vendor/third party AR target server(s) 230 and/or the auxiliary AR server(s) 240 for AR target IDs and related target data. As shown in FIG. 6A, any of those databases may store, for any given target of a physical object or location, a target ID (e.g., $A_{ID}$, $B_{Id}$, etc.), and perhaps some textual data (e.g., $A_{TEXT}$), a photo, graphic, recording, etc. (e.g., $A_{GRAPHIC}$), and/or a URL or other Internet object (e.g., $A_{LINK}$).

Upon retrieving related AR data related to the target, the AR server may send the related information back to the user's device, e.g., over electronic network 201 and any related cellular, Wi-Fi, or other networks, such that the user's device 104, 210 may receive and store the related information on local memory for presentation to the user (step 414). Of course, the user's device 104, 210 may present the related AR target data received from the server to the user using any known means, such as by presenting textual and/or visual/imagery data to the user on a display or touchscreen, displaying data overlaid on top of a digital representation of the physical object or location, displaying the data on a map of the location or target, and/or playing an audio sound, etc.

As the user continues to encounter various physical objects or locations, as desired, the user may continue to selectively scan, decode, photograph, or otherwise request AR data associated with those targets, and therefore continue to repeat steps 402-414. That is, the user's device may continue to check the local cache or memory for related data (step 404), and if necessary, request such data from the AR server (step 406). In some cases, the user's device may have stored therein some non-dynamic AR data related to the identified object, whereas in others, the AR server may send the user's device dynamic or non-dynamic AR data related to the identified object.

According to certain aspects of the present disclosure, when the AR server looks-up and sends to the user device some information related to the identified object or location, the AR server may perform additional steps for performing predictions of objects and locations likely to be requested by the user in the near future. For example, in one embodiment, the AR server may perform the steps of logging co-incident requests from the user device (step 416), identifying one or more high-scoring targets correlating to the co-incident requests (step 418), and streaming or otherwise sending to the user device information related to the one or more high scoring targets (step 420). In other words, the AR server may determine what one or more targets the user is likely to scan next, and preemptively stream AR data relating to those predicted targets to the user's device before the user has scanned such objects.

Specifically, in one embodiment, each time AR server receives an AR data request (step 408) and looks-up and sends related AR data to user's device (step 412), the AR server may also store in a database, e.g., databases 226, 335, information related to the request, including, e.g., the identity of the user making the request, the time of the request, the contents of the request (e.g., photo, barcode, etc.), and/or the data that was retrieved and sent back to the user's device in response to the request (step 416). Accordingly, the AR server may generate a log of user requests, which may be indexed and searchable by user, target ID, timestamps, categories, etc.

Figure 5:
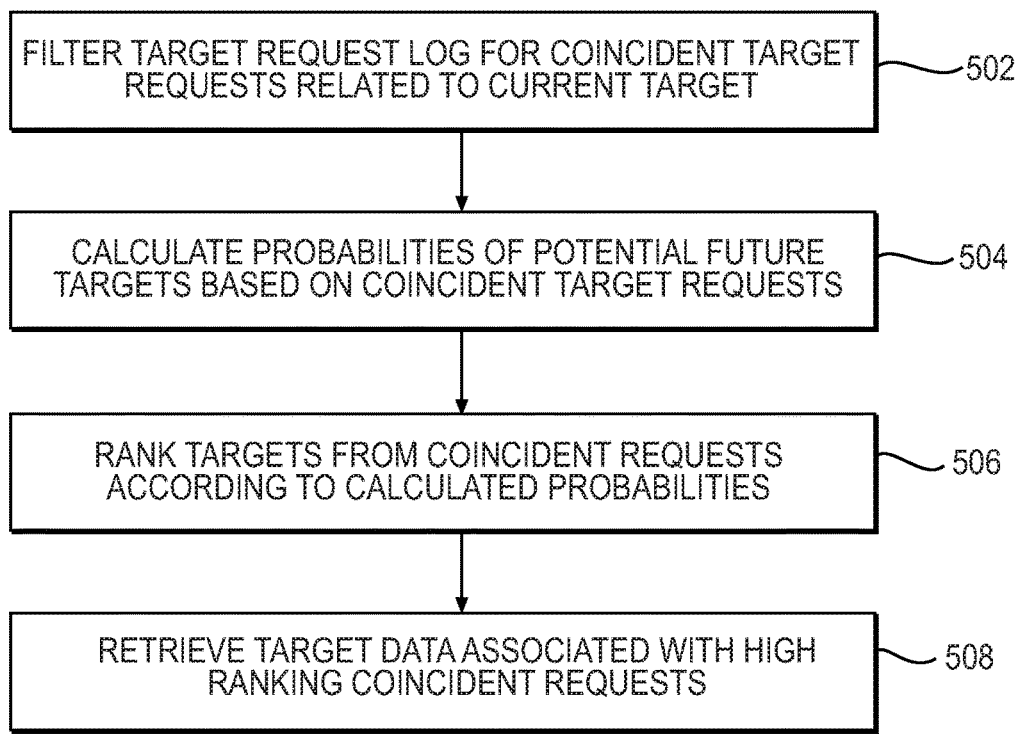
FIG. 5 is a process flowchart of exemplary method for determining potential targets to be identified in the mobile AR application method described in FIG. 4.

The AR server may then, at any time during method 400, identify high scoring targets correlating to the co-incident requests (step 418). FIG. 5 is a process flowchart of an exemplary method 500 for predicting potential targets to be streamed or otherwise transmitted to the mobile AR application of FIG. 3. As shown in FIG. 5, method 500 may include filtering the target request log (e.g., generated at step 416) for coincident target requests related to the current or last-requested target (step 502). Method 500 may further include calculating one or more probabilities that various potential future targets will be requested, based on an evaluation of the coincident target requests (step 504), using any suitable formula or algorithm, such as a machine learning algorithm and/or an artificial intelligence algorithm. For example, in one embodiment, the AR server may determine the "N" objects the user is most likely to scan or otherwise request next. In one embodiment, the AR server may determine, based on historical information, such as the created log of co-incident requests, the statistical likelihood that the user will request AR data for any particular AR target. In a database of millions of targets, for 99% of the targets, the likelihood of a user's subsequent selection of that respective target within some preset time period might be less than 0.01%. However, for some small subset of targets, there might be a >10% or maybe even >50% chance that the user will request AR data for those targets. As described above with respect to the simplified example of FIG. 1, if a user has already requested AR data for three of the four objects 122 in zone 120, the AR server might determine that there is a >50% chance that the user will next request AR data for the fourth and final object 122 in zone 120.

FIG. 6B illustrates an exemplary request log of user requests related to the predefined targets of FIG. 6A, as an exemplary use case for streaming target data for potential targets to be identified in a mobile AR application. As an overly simplified example, if users 1 and 2 requested AR data for AR targets "B" and then "C," in that order, and user 3 requested AR data for AR target "B" and then "D," then the AR server may determine that a subsequent user might have a 66% probability of subsequently requesting AR data for AR target "C," after requesting AR data for target "B." Thus, consistent with the presently disclosed embodiment, the AR server may determine to preemptively send AR data associated with AR target "C" (along with AR data associated with AR target "B") to a user that has just requested AR data for target "B." Likewise, if each of users 1-3 has requested AR data for target "E" within at least, e.g., five, AR requests from requesting AR data for both of targets "B" and "D," then the AR server might conclude that there is a high degree of co-incidence or correlation between those targets, and therefore preemptively transmit AR data for target "E" to a user device of another user that has only requested AR data for targets "B" and "D." Of course, the AR server may take into account the behavioral history of any number of other users, and may determine the request likelihood for any number of potentially requested AR targets.

Method 500 may further include ranking the targets from coincident requests according to the calculated probabilities (step 506). For example, the AR server might identify, for example, the N number of targets (e.g., 10, 20, 50, 100, etc.) for which there is at least some X % threshold likelihood (e.g., 20%, 50%, 70%) that the user will request AR data for that target within a threshold amount of time, T, (e.g., 10 min, 1 hour, 24 hours, etc.). In one embodiment, the qualifying targets may be ranked in order and/or scored for likelihood of subsequent selection. Method 500 may further include retrieving target data associated with high ranking coincident requests (step 508), for sending back to the user device. For example, in one embodiment, the content manager 332 of server(s) 220 may retrieve AR target data of the identified AR targets from one or more of database(s) 335, database(s) 226, the vendor/third party AR target server(s) 230, and auxiliary server(s) 240.

In one embodiment, a portion of the local memory at the mobile device may be dedicated as a target data cache for use in target identification by the client application based on real-world objects detected at the mobile device during the current session. In one embodiment, the identification of targets and high ranking coincident targets may be based on previously identified targets of prior requests received during one or more previous sessions of user activity. For example, the previous sessions may correlate to a current geographic location of the mobile device during the current session. The current and potential future targets may be associated with a target category according to one or more predetermined correlation parameters. The predetermined correlation parameters may include location, time, target type, user ID (e.g., where a higher score is generated for past target requests by the same user relative to past requests from other users, to account for individual patterns or behavioral characteristics of different users). The analysis of coincident requests may include identifying coincident target requests received (from same or different users) within a predetermined period of time during the current session. The current session may be any predetermined period of activity associated with one or multiple users of the AR application/content delivery service.

For example, in one embodiment, a "current session" may be a single session of user activity by the same user (e.g., where a single session for a user may correspond to a period of time starting from when the user launches the app at the device, then performs some activity such that a target request is received by the server (and the server logs the request) and ending when the user closes the app or discontinues use for a certain period of time (e.g., no indication of user activity is received at the server for a predetermined period of time). In one embodiment, the server may be configured to log only those user requests received during the current session. As such, the number of requests logged for the user or user's device may vary depending on how a current session is defined. For example, the current session may be any number of usage sessions over a predetermined period of time by the same user; one or more distinct predetermined time period of usage or user activity by the same user (e.g., limited to each usage of application, where only target requests occurring during a single usage session are logged. Alternatively, a user session may include any target request received from the same user's device within the same hour, day, week, etc. In yet another embodiment, a user session may take into consideration the AR requests for any user across any device, over any past amount of time.

In one embodiment, coincident requests or AR targets may be determined based on event logs stored at the device (and accessible by server or received in the target request) or stored at the server for each user/mobile device (server may assign a unique user/device ID for each registered user/device and maintain a target request history or session log for the user/device based on user activity/interaction with the AR app at the device.

In one embodiment, the AR server may perform a statistical analysis of usage data across multiple users for relevant time period to determine usage/target-scan patterns, which may be used to determine/predict targets that are likely to be scanned in the future. Such a statistical analysis may be individualized for the current user based on preferences specified by the user through the AR app or account info registered for the user or device at the server. In another embodiment, the determination of previous targets correlating to a current target may be performed based on the generated request log, with coincident requests being from same user or different users for target requests received during a "current session" of user activity (depending on the definition of current session). In one embodiment, the AR application may be configured to send automatic notifications, e.g., as a background process, to the server based on user interaction with a GUI of the AR app.

Method 400 may further including streaming or otherwise sending, from the AR server to the user device, any information relating to the identified high-scoring targets (step 420). In one embodiment, the identified AR data for the identified or predicted AR targets may be retrieved from another location, such as from vendor/third party AR target server(s) 230 and/or auxiliary AR server(s) 240. In any event, one or more AR servers may transmit the identified and retrieved AR data for the predicted AR targets to the user device 210 over electronic network 210, including over any related cellular and/or Wi-Fi network. Thus, the user's device may receive and store in cache or local memory the information related to the one or more high scoring targets (step 422). Because the user may or may not request AR data for the targets for which the user device preemptively received related AR data, it may be advantageous for the user device to execute an expiration policy to delete undesired or unused information or AR data from the user's device cache or memory (step 424).

Figure 7:
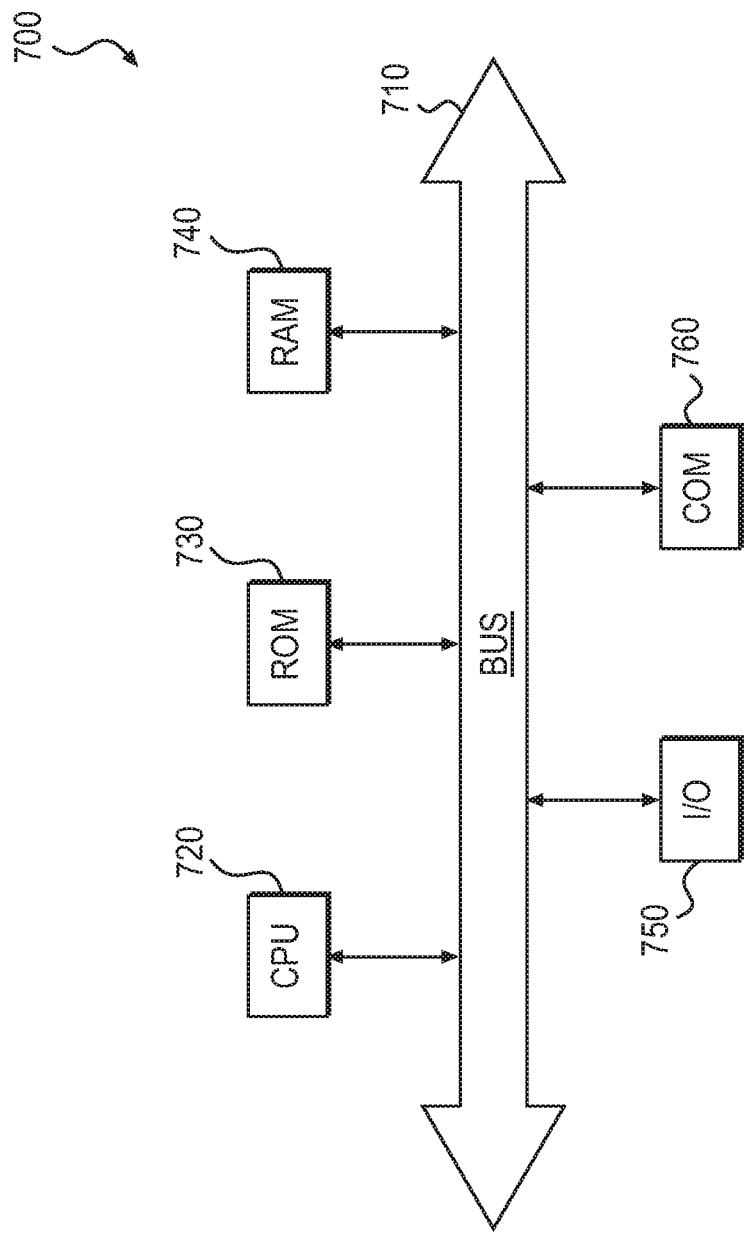
FIG. 7 is a simplified block diagram of an exemplary computer system in which embodiments of the present disclosure may be implemented.

FIG. 7 is a simplified block diagram of an exemplary computer system 700 in which embodiments of the present disclosure may be implemented. A platform for a server or the like 700, for example, may include a data communication interface for packet data communication 760. The platform may also include a central processing unit (CPU) 720, in the form of one or more processors, for executing program instructions. The platform typically includes an internal communication bus 710, program storage and data storage for various data files to be processed and/or communicated by the platform such as ROM 730 and RAM 740, although the server 700 often receives programming and data via a communications network (not shown). The hardware elements, operating systems and programming languages of such equipment are conventional in nature, and it is presumed that those skilled in the art are adequately familiar therewith. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

As described above, the computer system 700 may include any type or combination of computing systems, such as handheld devices, personal computers, servers, clustered computing machines, and/or cloud computing systems. In one embodiment, the computer system 700 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms, such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of transmitting data to a user device for potential virtual objects predicted to be identified in an augmented reality application, the method comprising:
   identifying, within a virtual environment corresponding to a real-world environment, a current virtual object representing a physical object within the real-world environment;
   determining at least one potential future virtual object to be identified by a first user based on the current virtual object;
   calculating, for each potential future virtual object, a correlation score based on the current virtual object, the correlation score representing a degree of correlation between each potential future virtual object and the current virtual object, the degree of correlation based on whether a second user and a third user selected the potential future virtual object in a previous session;
   determining at least one potential future virtual object to present to the first user based on the correlation score of the at least one potential future virtual object; and
   presenting to the first user virtual object data for each of the current virtual object and the determined at least one potential future virtual object within the virtual environment.

2. The method of claim 1, wherein the virtual object data for the current virtual object includes predefined content to be displayed as an overlay corresponding to a location of the current virtual object, as represented within the virtual environment.

3. The method of claim 2, wherein the at least one potential future virtual object correspond to a predetermined number of high-ranking virtual objects determined to have a degree of correlation to the current virtual object greater than a predetermined threshold.

4. The method of claim 1, wherein the identifying step comprises:
   identifying coincident virtual object requests based on a log of prior requests and one or more correlation parameters associated with prior requests in the log; and determining the at least one potential future virtual object based on the identified coincident virtual object requests and/or the current virtual object.

5. The method of claim 4, wherein the one or more correlation parameters include a time that each prior request for a previously identified virtual object was sent by a device, a geographic location of a physical object corresponding to the previously identified virtual object, and a user identifier associated with a user of the device from which the prior request was sent.

6. The method of claim 4, wherein the one or more correlation parameters further include a predetermined virtual object category associated with the previously identified virtual object.

7. The method of claim 1, wherein a request is received during a current session of user activity and a log of prior requests corresponds to virtual objects identified during the one or more previous sessions of user activity.

8. The method of claim 7, wherein the current session corresponds to a predetermined time period of the first user's interaction with a client application executable at the user device.

9. The method of claim 7, wherein the at least one potential future virtual object is identified prior to an expiration of the current session.

10. A system of transmitting data to a user device for potential virtual objects predicted to be identified in an augmented reality application, the system comprising:
a data storage device storing instructions for transmitting data to the user device for potential virtual objects predicted to be identified in an augmented reality application; and
a processor configured to execute the instructions to execute the method comprising:
identifying, within a virtual environment corresponding to a real-world environment, a current virtual object representing a physical object within the real-world environment;
determining at least one potential future virtual object to be identified by a first user based on the current virtual object;
calculating, for each potential future virtual object, a correlation score based on the current virtual object, the correlation score representing a degree of correlation between each potential future virtual object and the current virtual object, the degree of correlation based on whether a second user and a third user selected the potential future virtual object in a previous session;
determining at least one potential future virtual object to present to the first user based on the correlation score of the at least one potential future virtual object; and
presenting to the first user virtual object data for each of the current virtual object and the determined at least one potential future virtual object within the virtual environment.

11. The system of claim 10, wherein the virtual object data for the current virtual object includes predefined content to be displayed as an overlay corresponding to a location of the current virtual object, as represented within the virtual environment.

12. The system of claim 11, wherein the at least one potential future virtual object correspond to a predetermined number of high-ranking virtual objects determined to have a degree of correlation to the current virtual object greater than a predetermined threshold.

13. The system of claim 10, wherein the identifying step comprises:
identifying coincident virtual object requests based on a log of prior requests and one or more correlation parameters associated with prior requests in the log; and
determining the at least one potential future virtual object based on the identified coincident virtual object requests and/or the current virtual object.

14. The system of claim 13, wherein the one or more correlation parameters include a time that each prior request for a previously identified virtual object was sent by a device, a geographic location of a physical object corresponding to the previously identified virtual object, and a user identifier associated with a user of the device from which the prior request was sent.

15. The system of claim 13, wherein the one or more correlation parameters further include a predetermined virtual object category associated with the previously identified virtual object.

16. The system of claim 10, wherein the request is received during a current session of user activity and a log of prior requests corresponds to virtual objects identified during the one or more previous sessions of user activity.

17. The system of claim 16, wherein the current session corresponds to a predetermined time period of the first user's interaction with a client application executable at the user device.

18. The system of claim 16, wherein the at least one potential future virtual object is identified prior to an expiration of the current session.

19. A non-transitory computer-readable storage medium including instructions that, when executed by a computer, cause the computer to perform a method, the method comprising:
identifying, within a virtual environment corresponding to a real-world environment, a current virtual object representing a physical object within the real-world environment;
determining at least one potential future virtual object to be identified by a first user based on the current virtual object, wherein the first user is associated with a user device;
calculating, for each potential future virtual object, a correlation score based on the current virtual object, the correlation score representing a degree of correlation between each potential future virtual object and the current virtual object, the degree of correlation being based on whether the potential future virtual object is selected by the first user within a predetermined amount of time, the degree of correlation further being based on whether a second user and a third user selected the potential future virtual object in a previous session;
determining at least one potential future virtual object to present to the first user based on the correlation score of the at least one potential future virtual object; and
presenting to the first user virtual object data for each of the current virtual object and the determined at least one potential future virtual object within the virtual environment.

* * * * *